Figure 1:
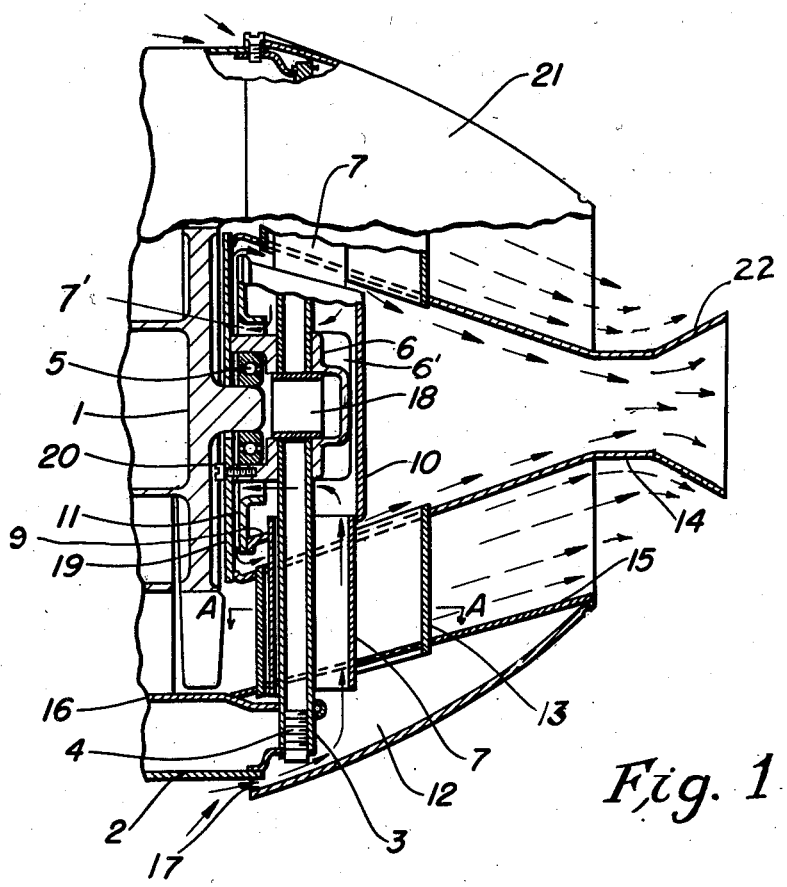

April 23, 1957

R. N. MIRZA 2,789,416

SYSTEM FOR COOLING A TURBINE BEARING
OF A GAS TURBINE POWER PLANT
Filed Aug. 26, 1953

INVENTORS
Rio N. Mirza
BY
Campbell Brumbaugh Free & Graves
ATTORNEYS

United States Patent Office 2,789,416
Patented Apr. 23, 1957

2,789,416

SYSTEM FOR COOLING A TURBINE BEARING OF A GAS TURBINE POWER PLANT

Rio N. Mirza, Northport, N. Y., assignor to Fairchild Engine and Airplane Corporation, Farmingdale, N. Y., a corporation of Maryland Application August 26, 1953, Serial No. 376,590

4 Claims. (Cl. 60—35.6)

This invention relates to power plants or engines of the gas turbine type, and has particular reference to structures and arrangements for cooling bearings and other parts of the power plant.

It has been a particular problem of designers of power plants or engines of the gas turbine type to provide a cooling medium for certain internal parts of the engine, and particularly any moving parts that may be located near sources of intense heat. The conventional solution to this problem has been bleeding air from the compressor of the engine and leading that air through ducts to the parts to be cooled. This solution, however, has not been satisfactory because the removal of air from the compressor affects the efficiency of the turbine as a whole. Moreover, the air leaving the compressor is of relatively high temperature and the air ducts have necessarily been in close relative position to other high temperature parts of the engine, so that inordinately large ducts were required to direct a sufficient quantity of air to the desired parts because of the relatively high compression air temperatures. This, in turn, involved larger surfaces of the ducts which absorbed more heat.

In accordance with the present invention, a cooling system for gas turbine power plant parts, such as bearings, is provided, in which compressor air is not utilized for that purpose, so that the aforementioned difficulties are overcome. Instead, the exhaust turbine gases are utilized as a source of power to circulate a cooling medium to the parts to be cooled, thereby reducing to a minimum the proximity of the cooling medium ducts to high temperature parts of the engine.

In a preferred embodiment of the invention, the high velocity exhaust gases are caused to flow over a tail cone of such shape and location as to afford a venturi effect, so that a suction is created at its outlet to draw cooling air from a point outside the engine through ducting and over the turbine bearing housing or other part to be cooled so as to abstract heat therefrom to a degree and at a rate such as to maintain the bearing or other part below its critical working temperature. The cooling air is preferably withdrawn from an annular chamber surrounding the exhaust nozzle and supplied with ram air through an air scoop directed in the direction of travel of the engine.

It will be seen that the cooling system of this invention is simple and self-contained without moving parts and not only reduces the size of air ducting that is necessary to conduct the air from a suitable source outside the engine to the point of use, but takes advantage of the aspirating effect of the exhaust gases which enables the cooling system to begin operation as soon as the engine starts, although advantage is also taken of the ram effect of the slip stream when the engine is in motion.

Figure 2:
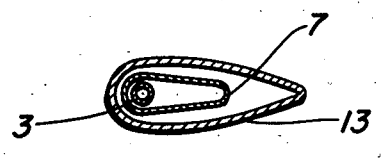

For a more complete understanding of the invention, reference may be had to the accompanying drawings, in which:

Figure 1 is an axial section through the turbine and exhaust gas nozzle end of a turbojet engine and embodying the air cooling system of this invention for cooling the turbine bearings, and Fig. 2 is a cross-section through the nested struts utilized in the cooling system of this invention, as seen along the line A—A of Fig. 1.

Referring particularly to Figure 1, numeral 1 indicates a turbine wheel supported at its rear end in housing 2 by means of struts 3, secured at their outer ends to housing 2 by screws 4 and at their inner ends to housing 6 in which they are positioned by sleeve 18. Interposed between bearing housing 6 and turbine wheel 1 is turbine bearing 5 which may be a ball bearing, as shown in Fig. 1.

Enclosing each supporting strut 3 is a flat tubular strut 7 supported by shroud 9 which in turn supports central duct 10 having its forward wall 11 surrounding, but spaced axially from, bearing housing 6 by annular slot 7'. The interior of each strut 7, having the cross-sectional shape shown in Fig. 2, forms a duct connecting the interior of central duct 10 with annular space 12, thus providing the intake ducting of the cooling system to be further described.

Also enclosing each strut 7 is a strut 13 supporting tail cone 14 which is in turn supported by exhaust nozzle 15, which receives its support from turbine housing 16. It will be observed from Fig. 2 that strut 13 is of streamline cross-section in the direction of flow of the exhaust gases, indicated by dotted arrows in Fig. 1, but that strut 13 is sealed from annular chamber 12.

Divider 19 separates the inner end of tail cone 14 from the turbine wheel 1 and substantially closes central duct 10 from communication with the turbine wheel 1. Divider 19 thus prevents flow of air from central duct 10 into the turbine nozzle as well as flow of gases from the turbine nozzle into the exhaust or tail cone 14. Divider 19 is attached to housing 6 by screws 20 and its outer edge supports the inner end of the tail cone 14.

A rearward extension or fairing 21 of the casing 2 is secured at its inner end thereto, thus forming with exhaust nozzle 15 the aforementioned annular space 12, which lies outside of the engine proper, which is enclosed in turbine housing 16. The inner end of extension or fairing 21 is spaced outwardly from casing 2 so as to afford the boundary layer air inlet gill or scoop 17 which communicates with the annular space 12 leading to ducts 7 as aforementioned. The rear end of extension or fairing 21 abuts and may be secured to the rear end of exhaust nozzle 15 so as to seal the annular space 12 against outlet of air at that point.

Extending rearwardly from the tip of tail cone 14 and flaring outwardly therefrom at an angle of about 30° is a conical deflector 22 which thus extends into and deflects the exhaust gas stream emerging at high velocity from exhaust nozzle 15, as indicated by the dotted line arrows in Fig. 1. By reason of the deflector 22, an annular venturi configuration is imparted to the exit from nozzle 15. As the result, the pressure at the open end of deflector 22 is decreased, thereby augmenting the outflow of air in the direction of the solid line arrows shown in Fig. 1.

Operation of the cooling system of this invention is evident from the foregoing description thereof as the result of the low pressure created at the cooling air outlet from the deflector 22 on the end of the tail cone 14. Boundary air entering gill or scoop 17 at high velocity due to forward motion of the jet or aircraft powered at least in part by the gas turbine engine, builds up pressure in annular chamber 12 due to the ram effect. The pressure air flows from chamber 21 through ducts 7 into central duct 10 and passes over housing 6 of turbine bearing 5. Housing 6 being cooled by this large volume air flow thereover, draws heat from bearing 5 and its appurtenant parts, thereby reducing the temperature of bearing 5 below its critical working temperature. Housing 6 may be provided with radial heat radiating fins 6' to increase the heat radiating area thereof in a known manner.

The cooling air leaving central duct 10 flows out through annular slot 7' between housing 6 and wall 11 and thence between wall 11 and divider plate 19, thereby cooling the latter, and in turn the turbine wheel 1 by heat radiation therefrom. The cooling air then flows into the enlarged front end of tail cone 14 whose interior is under reduced pressure because of the aspirating effect of the high velocity gases flowing past the tail cone discharge opening, this aspirating effect being augmented by the deflector 22 in the manner described. The cooling air in tail cone 14 is also heated by radiation from the inner surface of cone 14 due to the hot gases flowing over its outer surface, so that the air is further expanded to increase its exit velocity from the tail cone.

In this way, the turbine bearing 5 is effectively cooled and the same basic principle of drawing air through a duct system by means of suction created at the cooling air outlet by making use of the aspirating effect of the high velocity exhaust gas stream may be used to cool other interior parts of the engine without bleeding hot air from the compressor for that purpose.

It will be observed that while advantage is taken of the ram effect of slip stream or boundary air, the exhaust gas stream effects the flow of cooling air from the moment that the engine starts, so that flight is not necessary to make the cooling system of this invention effective.

Although a preferred embodiment of the invention has been illustrated and described herein, it is to be understood that the invention is not limited thereby, but is susceptible of changes in form and detail within the scope of the appended claims.

I claim:

1. In combination with a gas turbine engine having a turbine wheel and an enclosing housing therefor having a bearing for said wheel and affording a discharge opening for the exhaust gases from said wheel, a hollow tail cone open at its outer end surrounding said bearing and located within said exhaust gas discharge opening for flow of said exhaust gases around said cone, a deflector for the exhaust gases on the outer end of said tail cone and having an outwardly flared outer surface forming a venturi throat for creating a reduced pressure in the tail cone by flow of exhaust gases around said deflector and a duct connecting the interior of said cone to a source of cooling air for circulation around said bearing induced by the reduced pressure in said tail cone.

2. In combination with a gas turbine engine having a turbine wheel and an enclosing housing therefor having a bearing for said wheel and affording a discharge opening for the exhaust gases from said wheel, a hollow tail cone surrounding said bearing and having an open outer end located within said exhaust gas discharge opening for flow of said exhaust gases therearound, deflector means on the outer end of the tail cone having an outwardly flared outer surface and an open outer end communicating with the interior of said cone, said deflector means forming a venturi throat at the outer end of said tail cone to create an aspirating effect in the tail cone by flow of the exhaust gases through said throat and a duct connecting the interior of said cone to said source of cooling air for circulation around said bearing induced by said aspirating effect.

3. In combination with a gas turbine engine having a turbine wheel and an enclosing housing therefor having a bearing for said wheel and affording a discharge opening for the exhaust gases from said wheel, a tail cone surrounding said bearing and located within said exhaust gas discharge opening for flow of said exhaust gases around said cone, an outwardly-flaring extension on the end of said tail cone open at its outer end and projecting partly in the exhaust gas stream surrounding said tail cone to form a venturi throat for creating a reduced pressure in said tail cone, and a duct connecting the interior of said cone to a source of cooling air for circulation around said bearing induced by the reduced pressure in said tail cone.

4. In combination with a gas turbine engine having a turbine wheel and an enclosing housing therefor having a bearing for said wheel and affording a discharge opening for the exhaust gases from said wheel, a tail cone within said exhaust gas discharge opening for flow of said exhaust gases around said cone, a casing within said tail cone surrounding said bearing, an outwardly-flaring extension on the end of said tail cone open at its outer end and projecting partly in the exhaust gas stream surrounding said tail cone and forming a venturi throat for inducing an aspirating effect in said tail cone, and a duct connecting the interior of said casing to a source of cooling air for circulation around said bearing induced by said aspirating effect.

References Cited in the file of this patent

UNITED STATES PATENTS

| | | |
|---|---|---|
| 2,479,573 | Howard | Aug. 23, 1949 |
| 2,483,401 | Cole | Oct. 4, 1949 |
| 2,548,886 | Howard | Apr. 17, 1951 |
| 2,591,399 | Buckland et al. | Apr. 1, 1952 |
| 2,639,579 | Willgoos | May 26, 1953 |
| 2,640,319 | Wislicenus | June 2, 1953 |
| 2,692,724 | McLeod | Oct. 24, 1954 |